(12) United States Patent
Warschat et al.

(10) Patent No.: US 9,196,102 B2
(45) Date of Patent: Nov. 24, 2015

(54) START SYSTEM FOR A CAR, CAR HAVING A START SYSTEM, AND METHOD FOR OPERATING A START SYSTEM FOR A CAR

(71) Applicant: AUDI AG, Ingolstadt (DE)

(72) Inventors: Ulf Warschat, Pliening (DE); Tobias Ott, Wolnzach (DE); Patrick Sassmannshausen, Hettenshausen (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/365,348

(22) PCT Filed: Feb. 8, 2013

(86) PCT No.: PCT/EP2013/000384
§ 371 (c)(1),
(2) Date: Jun. 13, 2014

(87) PCT Pub. No.: WO2013/120596
PCT Pub. Date: Aug. 22, 2013

(65) Prior Publication Data
US 2015/0002265 A1 Jan. 1, 2015

(30) Foreign Application Priority Data
Feb. 15, 2012 (DE) .......................... 10 2012 003 015

(51) Int. Cl.
*G05B 19/00* (2006.01)
*G07C 9/00* (2006.01)
(Continued)

(52) U.S. Cl.
CPC ............ *G07C 9/00031* (2013.01); *B60R 16/02* (2013.01); *B60R 25/24* (2013.01); *B60R 25/243* (2013.01); *B60R 25/245* (2013.01)

(58) Field of Classification Search
USPC ......... 340/5.72, 426.13, 5.7, 539.13; 180/287
See application file for complete search history.

(56) References Cited

U.S. PATENT DOCUMENTS 5,157,389 A * 10/1992 Kurozu ............... B60R 25/2063
307/10.2
5,751,073 A * 5/1998 Ross ....................... B60R 25/24
123/179.2
(Continued)

FOREIGN PATENT DOCUMENTS

CN 101847311 9/2010
DE 19924081 11/2000
(Continued)

OTHER PUBLICATIONS

WIPO provided English translation of International Preliminary Report on Patentability mailed Aug. 28, 2014 for corresponding International Patent Application No. PCT/EP2013/000384.
(Continued)

*Primary Examiner* — Jennifer Mehmood
*Assistant Examiner* — Rufus Point
(74) *Attorney, Agent, or Firm* — Staas & Halsey LLP

(57) ABSTRACT

A method for operating a starting system for a car includes detecting locking of the car, checking whether a portable code transmitter of the starting system is inside a monitoring region, deactivating a starting device of the starting system if the portable code transmitter is not inside the monitoring region, receiving an unlocking signal and identity signal from the portable code transmitter by the starting system on the car, checking whether identity data received with the identity signal matches identity data stored in the starting system, and activating the starting device if the identity data matches the identity data stored in the starting system.

20 Claims, 2 Drawing Sheets

(51) Int. Cl.
*B60R 16/02* (2006.01)
*B60R 25/24* (2013.01)

(56) References Cited

U.S. PATENT DOCUMENTS

| | | | | |
|---|---|---|---|---|
| 6,522,027 | B1* | 2/2003 | Morillon | B60R 25/245 307/10.1 |
| 6,718,240 | B1* | 4/2004 | Suda | B60N 2/0248 318/480 |
| 7,053,499 | B2* | 5/2006 | Fischer | G08C 19/28 180/287 |
| 7,358,849 | B1* | 4/2008 | Pesina | B60R 25/245 340/426.17 |
| 8,203,424 | B2 | 6/2012 | Ghabra et al. | |
| 2002/0050922 | A1* | 5/2002 | Sashida | B60R 25/33 340/5.72 |
| 2003/0098615 | A1* | 5/2003 | Fischer | G08C 19/28 307/10.5 |
| 2003/0135321 | A1* | 7/2003 | Kumazaki | B60K 28/02 701/112 |
| 2003/0222756 | A1* | 12/2003 | Shimonomoto | B60R 25/246 340/5.61 |
| 2003/0222757 | A1* | 12/2003 | Ghabra | B60R 25/24 340/5.72 |
| 2003/0231550 | A1* | 12/2003 | Macfarlane | B60R 25/257 367/198 |
| 2004/0104588 | A1* | 6/2004 | Ichikawa | B60R 25/24 296/37.1 |
| 2004/0119628 | A1* | 6/2004 | Kumazaki | B60N 25/2009 341/176 |
| 2004/0178883 | A1* | 9/2004 | Haselsteiner | B60R 25/24 340/5.72 |
| 2005/0024181 | A1* | 2/2005 | Hofbeck | B60R 25/02 340/5.7 |
| 2005/0046568 | A1* | 3/2005 | Tanaka | B60R 25/245 340/539.13 |
| 2006/0012462 | A1* | 1/2006 | Teshima | B60R 25/04 340/5.61 |
| 2006/0061459 | A1* | 3/2006 | Kawamura | B60R 25/245 340/426.36 |
| 2006/0076834 | A1* | 4/2006 | Kamiya | B60R 25/02153 307/10.1 |
| 2006/0236970 | A1* | 10/2006 | Inada | B60R 25/042 123/179.4 |
| 2006/0255908 | A1* | 11/2006 | Gilbert | B60R 25/24 340/5.61 |
| 2007/0109093 | A1* | 5/2007 | Matsubara | G07C 9/00309 340/5.61 |
| 2008/0150712 | A1* | 6/2008 | Cooprider | B60C 23/0444 340/447 |
| 2009/0189735 | A1* | 7/2009 | Murakami | B60R 25/305 340/5.64 |
| 2009/0243795 | A1* | 10/2009 | Ghabra | B60R 25/246 340/5.72 |
| 2009/0289759 | A1* | 11/2009 | Tsuchiya | B60R 25/24 340/5.72 |
| 2010/0073153 | A1* | 3/2010 | Yamaguchi | B60R 25/2036 340/426.17 |
| 2010/0109914 | A1* | 5/2010 | Tieman | G08G 1/005 340/991 |
| 2010/0265035 | A1 | 10/2010 | Ziller | |
| 2011/0054735 | A1* | 3/2011 | Kamiya | B60R 25/245 701/36 |
| 2011/0309922 | A1* | 12/2011 | Ghabra | B60R 25/24 340/426.36 |
| 2014/0274013 | A1* | 9/2014 | Santavicca | H04W 4/008 455/418 |

FOREIGN PATENT DOCUMENTS

| | | |
|---|---|---|
| DE | 10024852 | 11/2001 |
| DE | 102004007679 | 8/2004 |
| DE | 10310869 | 9/2004 |
| DE | 10350081 | 6/2005 |
| DE | 102009002448 | 10/2010 |
| DE | 102010001652 | 10/2010 |
| DE | 102012003015 | 2/2012 |
| EP | 0897841 | 2/1999 |
| EP | 0984123 | 3/2000 |
| EP | 1607291 | 12/2005 |
| EP | 2383155 A1 * | 11/2011 |
| EP | 2013/000384 | 2/2013 |
| WO | 2004/005086 | 1/2004 |

OTHER PUBLICATIONS

German Office Action for German Priority Patent Application No. 10 2012 003 015.0, issued Oct. 19, 2012, 5 pages.
English Language International Search Report for PCT/EP2013/000384, mailed Apr. 24, 2013, 2 pages.
Chinese Office Action for related Chinese Patent Application No. 201380002673.4, issued Jun. 2, 2015, 5 pages.

* cited by examiner

START SYSTEM FOR A CAR, CAR HAVING A START SYSTEM, AND METHOD FOR OPERATING A START SYSTEM FOR A CAR

CROSS REFERENCE TO RELATED APPLICATIONS

This application is based on and hereby claims priority to International Application No. PCT/EP2013/000384 filed on Feb. 8, 2013 and German Application No. 10 2012 003 015.0 filed on Feb. 15, 2012, the contents of which are hereby incorporated by reference.

BACKGROUND

The invention relates to a method for operating a starting system for a car and to a starting system for a car and to a car.

Cars are increasingly being equipped with starting systems in which starting an engine of the car no longer requires a key to be inserted into an ignition lock and turned. Instead, there are frequently solutions in which a portable code transmitter in the form of a transponder now just needs to be carried by the driver of the car, with the driver now only needing to operate a starting device, which usually has a start/stop button, in order to start the engine of the car.

After the vehicle is opened and the driver sits in the driver's seat and the start/stop button of the normally always activated starting device is operated, a monitoring device usually checks whether the portable code transmitter is inside the car, particularly inside the passenger compartment of the car. In particular, this involves the monitoring device transmitting a request signal that the portable code transmitter receives if it is inside the monitoring region and the latter for its part transmitting a response signal that the monitoring device receives, as a result of which the latter detects that the portable code transmitter is actually inside the monitoring region, that is to say inside the passenger compartment of the car. As soon as the starting system has detected that the portable code transmitter is inside the car, the engine is started.

In conventional starting systems, the monitoring device is usually always active, and hence even when the vehicle is locked and there is no passenger in the passenger compartment, which means that in principle it is constantly transmitting the request signal in order to check whether the code transmitter may be inside the car. There are also starting systems in which the monitoring device transmits the request signal only as soon as the start/stop button has been operated. In both cases, there is an increased risk of theft of a car that is equipped with such a starting system. After an unauthorized party has gained unauthorized access to the car, for example by having broken the door lock, it can manipulate the request signal transmitted by the monitoring device, as a result of which the car can be started and hence also stolen even without the presence of a key or portable code transmitter.

SUMMARY

One potential object is to provide a solution that is used to achieve improved theft prevention for cars.

The inventors propose a method for operating a starting system for a car comprises:
locking of the car is detected by the starting system, and a monitoring device in the starting system is used to check whether a portable code transmitter of the starting system is inside a monitoring region of the monitoring device;

a starting device of the starting system is deactivated by a control device of the starting system if the portable code transmitter is not inside the monitoring region;

an operator control element of the portable code transmitter is operated and an unlocking signal that initiates the unlocking of at least one door of the car and also an identity signal that comprises identity data are transmitted wirelessly by the portable code transmitter;

the unlocking signal and the identity signal are received by the starting system on the car;

the control device is used to check whether the identity data received with the identity signal match identity data stored in the starting system;

the starting device is activated by the control device if the identity data received with the identity signal match the identity data stored in the starting system.

In other words, the proposals provide for the starting device of the starting system always to be deactivated as soon as the car is locked and the portable code transmitter is not inside the car. In order to reactivate the starting device, the method requires an appropriate operator control element of the portable code transmitter to be actively operated by an appropriate user. Only then is firstly the unlocking signal for unlocking the car transmitted and secondly an identity signal comprising identity data likewise transmitted by the portable code transmitter. Only after successful alignment of the identity data transmitted by the portable code transmitter and the identity data stored as appropriate inside the starting system is reactivation of the starting device made possible.

The simultaneous check on whether the portable code transmitter is inside the car as soon as the car is locked allows undesirable deactivation of the starting device to be avoided. By way of example, it is conceivable for central locking to occur as a result of operation of a switch provided inside the car, the driver himself sitting in the car as previously. In such a case, it would not make sense for the starting device to be deactivated, since in order to start the engine, which quite generally may be an internal combustion engine, an electric motor, a hybrid drive or another drive device, for example, it would first be necessary for the operator control element of the portable code transmitter to be operated again in order to be able to start the engine again after it has been switched off. Those cases in which speed-dependent automatic locking of the car takes place are also covered by the solution. So long as the portable code transmitter is inside the car, the starting device is not deactivated, despite the car being locked, which means that the engine can be started again at any time after it has been switched off.

Since it is always necessary to actively operate the operator control element of the portable code transmitter in order to activate the deactivated starting device again, it is possible to effectively prevent a car with such a starting system from easily being able to be stolen after a thief has gained unauthorized access to the car. This is because so long as the thief is himself unable to operate the relevant operator control element of the portable code transmitter, the starting device of the starting system remains deactivated, which means that the engine of the car cannot be started in the first place. The radio extension mentioned at the outset for the request signal from the monitoring device and the radio extension of the response signal from the portable code transmitter therefore remain ineffective so long as the starting device itself is not activated. In other words, when the car is locked and the starting device is accordingly deactivated, it is thus not possible for the starting system to be deceived into believing that the portable code transmitter is inside the car, which means that illegitimate starting of the engine of the car is prevented in such a case too.

Therefore, an improved method for operating a starting system for a car is provided that can be used to achieve increased theft prevention.

When a starting device is deactivated, an operating state is set in which there is particularly no possibility of the drive device of the vehicle being started, particularly no kind of starting signal is produced for a controller as a result of operation of a start/stop operator control element.

In one advantageous embodiment, the monitoring device checks whether the portable code transmitter is inside the monitoring region that covers substantially the passenger compartment of the car by virtue of the monitoring device transmitting a request signal, and the portable code transmitter receiving the request signal if said code transmitter is inside the monitoring region and for its part transmitting a response signal that the monitoring device receives, as a result of which the latter detects that the portable code transmitter is inside the monitoring region. In other words, the portable code transmitter is in the form of a transponder that transmits an appropriate response signal in response to a received request signal from the monitoring device, as a result of which it is possible to check whether the portable code transmitter is inside the car.

In a further advantageous embodiment, the monitoring device is activated exclusively when the starting device is activated, and checks whether the portable code transmitter of the starting system is inside the monitoring region. Constant transmission of request signals from the monitoring device can therefore be avoided.

In a further advantageous embodiment, if the identity data received with the identity signal do not match the identity data stored in the starting system, the portable code transmitter is positioned inside a prescribed effective region of an authentication device of the starting system and is checked for its authorization to activate the starting device, and the control device activates the starting device if authorization is available. By way of example, cases are conceivable in which the portable code transmitter would indeed actually be authorized to activate the starting device, but a disturbance in the transmission of the identity data or a fault inside the starting system, for example, results in erroneous transmission of the identity signal or no transmission of the identity signal at all. As a result, it is also impossible for any alignment or suitable alignment to take place between the identity data that are stored inside the portable code transmitter and the identity data that are stored in the starting system itself. Advantageously, a type of "emergency starting system" is provided by the authentication device, which may be in the form of what is known as a transponder coil, for example. The authentication device repeatedly transmits a request signal that has just one range inside the effective region of the authentication device for example. This range is just a few centimeters, which means that the portable code transmitter needs to be applied more or less directly to the authentication device in order to perform the authorization check. As soon as the request signal has been transmitted, the authentication device changes to a reception mode for a predetermined period. If the portable code transmitter is positioned inside the effective region, it receives the request signal and for its part in turn transmits a response signal that the authentication device receives. If this is a correct response signal, corresponding authorization of the portable code transmitter is established. Thus, as soon as an authorized portable code transmitter is available, it can initiate reactivation of the starting device.

If at least one of the doors of the car is unlocked by the portable code transmitter but without operation of the operator control element of the portable code transmitter, the method provides for the portable code transmitter likewise to be positioned inside a prescribed effective region of the authentication device of the starting system and to be checked for its authorization to activate the starting device, and for the control device to activate the starting device if authorization is available. This is intended to allow the car to be started without problems even if a user of the car should decide to unlock the driver's door of the car, for example, by conventionally inserting the portable code transmitter in the form of a key into a corresponding lock on the driver's door and operating the lock. By way of example, it could be conceivable for an empty battery in the portable code transmitter to mean that it is no longer possible for the unlocking signal and the identity signal to be transmitted, which means that it is necessary for the car to be unlocked manually. In this case, the authentication device can likewise be used to easily bring about activation of the starting device should appropriate authorization of the portable code transmitter be available.

A further advantageous embodiment is distinguished in that, if at least one of the doors of the car is unlocked without the use of the portable code transmitter and the portable code transmitter is not inside the monitoring region, the starting device is not activated. In other words, the starting device remains deactivated if anyone gains access to the car without using the portable code transmitter, that is to say without authorization, which means that a correspondingly good level of theft prevention for the car is ensured, since the starting device remains deactivated.

In a further advantageous embodiment, following the operation of the activated starting device by the monitoring device a check is performed to determine whether the portable code transmitter is inside the monitoring region, and a starting procedure for an engine of the car is initiated by the starting device exclusively if the portable code transmitter is inside the monitoring region. This ensures that the car can actually be started only when the portable code transmitter is inside the car. By way of example, cases would be conceivable in which a first person unlocks the car by appropriate operation of the portable code transmitter and in so doing likewise prompts activation of the starting device, but a second person sits in the driver's seat and wishes to start the car, without the person who is carrying the portable code transmitter actually having sat in the car. If the starting of the car were nevertheless made possible in such a case, the second person could drive the car away, switch off the engine and not start the car again, however, since he has not taken the portable code transmitter with him. The solution avoids such and similar cases.

In addition, the method provides that, when the engine is running following opening of at least one door and/or window that closes the passenger compartment and/or of a sliding roof apparatus, the monitoring device checks whether the portable code transmitter is inside the monitoring region, and a warning signal is output if the portable code transmitter is not inside the monitoring region. This ensures that a driver of the car is immediately informed if the portable code transmitter is removed from the interior region of the car. By way of example, a front-seat passenger who has taken the portable code transmitter with him could get out of the car and in so doing forget to leave the portable code transmitter in the car. This could in turn result in the aforementioned case in which, after the engine is switched off, it can no longer be switched on. Hence, such cases are avoided by virtue of the position monitoring of the portable code transmitter after the passenger compartment shell is opened and an appropriate warning is output.

In a further advantageous embodiment, during the wireless transmission of the unlocking signal by the portable code transmitter, an identification signal is transmitted wirelessly that is used to perform a check on authorization of the portable code transmitter to unlock the car. In other words, an authorization query is thus made, with the portable code transmitter transmitting the unlocking signal, as a result of which the car is unlocked only if the portable code transmitter has appropriate authorization. In this case, the identification signal for checking the authorization of the portable code transmitter to unlock the car and the previously already mentioned identity signal that is used to check whether the portable code transmitter is authorized to activate the starting device again may be two different signals. Alternatively, however, it is also conceivable for the two signals to be combined in one coded signal. In addition, it is likewise possible for the transmission of a locking signal likewise to involve the transmission of a further identification signal that is used to check whether the portable code transmitter is actually authorized to lock the car.

In a further advantageous refinement, the starting system is used to store new identity data on a user-defined basis, and said identity data are likewise stored in the portable code transmitter and/or at least one further code transmitter. In other words, it is possible for a user of the car himself to determine whether he wishes to alter the identity data that are used to perform the identity check on the portable code transmitter or on further portable code transmitters. This can allow an additional increase in theft prevention, since the user can change the identity data from time to time autonomously.

The inventors also propose a starting system or a starting apparatus for a car having a starting system on the car that comprises a control device, a starting device, a monitoring device and an authentication device and also having at least one portable code transmitter is distinguished in that the starting system is designed to detect locking of the car, and the monitoring device is designed to check whether the portable code transmitter is inside a monitoring region of the monitoring device;

the control device is designed to deactivate the starting device if the portable code transmitter is not inside the monitoring region;

the portable code transmitter has at least one operator control element and is designed to transmit wirelessly an unlocking signal that initiates unlocking of at least one door of the car and also an identity signal that comprises identity data;

the starting system on the car is designed to receive the unlocking signal and the identity signal;

the control device is designed to check whether the identity data received with the identity signal match identity data stored in the starting system; and the control device is designed to activate the starting device if the identity data received with the identity signal match the identity data stored in the starting system.

Advantageous embodiments of the method can be regarded as advantageous embodiments of the starting system, wherein in this case particularly the starting system comprises means that can be used to perform the method.

The inventors propose a car comprises a starting system or an advantageous embodiment of the starting system.

Further advantages, features and details can be found in the description below of a preferred exemplary embodiment and with reference to the drawing. The features and combinations of features cited above in the description and also the features and combinations of features cited below in the description of the figures and/or shown in the figures alone can be used not only in the respectively indicated combination but also in other combinations or on their own without departing from the scope.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
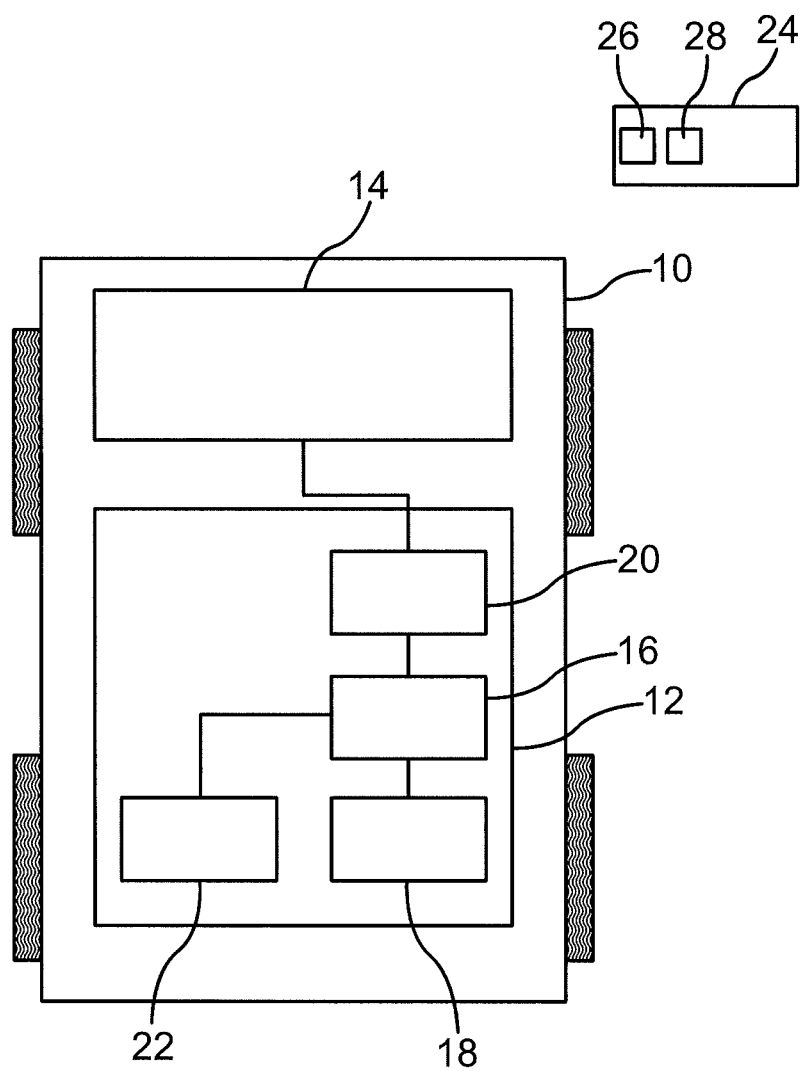
FIG. 1 shows a schematic illustration of a car in which a starting system on the car having a control device, a starting device, a monitoring device and an authentication device is arranged, wherein a portable code transmitter of the starting system is shown outside the car.

Reference will now be made in detail to the preferred embodiments of the present invention, examples of which are illustrated in the accompanying drawings, wherein like reference numerals refer to like elements throughout.

FIG. 1 depicts a car 10 that comprises a starting system 12 on the car and an engine 14. In addition, the starting system 12 on the car comprises a control device 16, a monitoring device 18, a starting device 20 and an authentication device 22.

In this case, the control device 16 is connected to the monitoring device 18, to the starting device 20 and to the authentication device 22 such that signals and/or control signals can be interchanged between these elements. In addition, the starting device 20 is connected to the engine 14 of the car 10 such that the starting device 20 can be used to start the engine 14. If the engine 14 is an internal combustion engine, the starting device 20 is connected via a starter motor, not shown here, which is in turn connected to the engine 14.

As a start/stop operator control element, the starting device 20 comprises a start/stop button, not shown, for example, which is arranged in the interior of the car 10 and which can be operated by a user, so that starting of the engine 14 can be initiated. Furthermore, operation of the start/stop key also allows the engine 14 to be stopped again.

Furthermore, FIG. 1 depicts a portable code transmitter 24 that can be used to lock and unlock the car 10. To this end, the portable code transmitter 24 has an operator control element 26 for locking and an operator control element 28 for unlocking the car 10. The portable code transmitter is designed to transmit an unlocking signal that initiates unlocking of at least one door—not shown here—of the car 10, an identification signal and also an identity signal that comprises identity data wirelessly as soon as the operator control element 28 is operated. Furthermore, the portable code transmitter is designed to transmit a locking signal that initiates locking of at least one door—not shown here—of the car 10 and also an identification signal wirelessly as soon as the operator control element 26 is operated.

The starting system 12 on the car and the portable code transmitter 24 form a starting system for the car 10. The starting system is designed to detect locking of the car 10, and the monitoring device 18 is designed to check whether the portable code transmitter 24 is inside a monitoring region— not shown here—of the monitoring device 18. In the present case, the monitoring region is a passenger compartment of the car 10.

In addition, the control device 16 is designed to deactivate the starting device 20 if the portable code transmitter 24 is not inside the monitoring region. The starting system 12 on the car is in turn designed to receive the unlocking signal and the identity signal, wherein the control device 16 for its part is designed to check whether the identity data received with the identity signal match identity data stored in the starting system 12. In addition, the control device 16 is designed to activate the starting device 20 if the identity data received with the identity signal match the identity data stored in the starting system.

Figure 2:
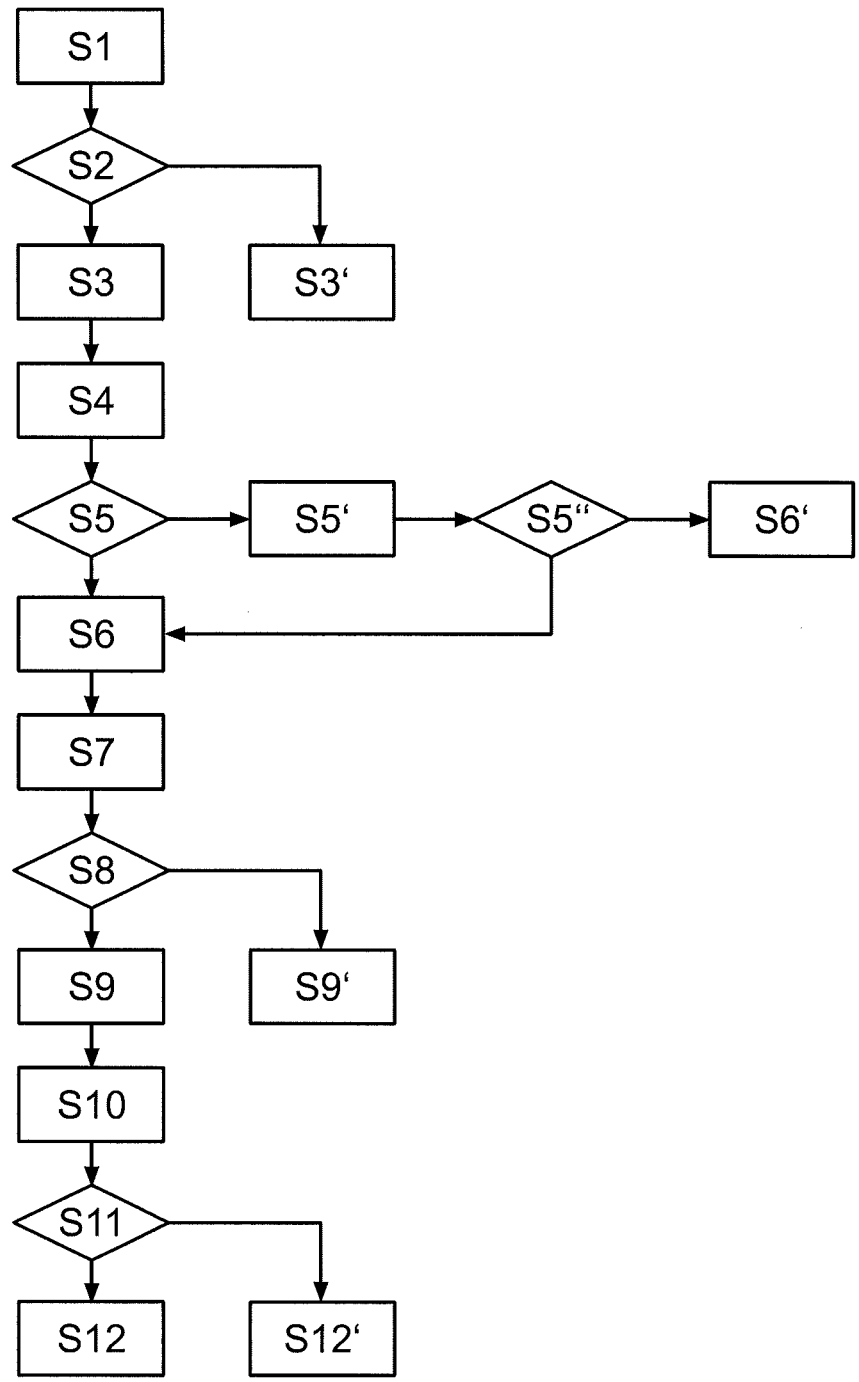
FIG. 2 shows a schematic flowchart in which individual parts of a method for operating a starting system for a car are shown.

FIG. 2 shows a schematic flowchart in which individual parts of the method for operating the starting system are shown. In S1, the operator control element 26 of the portable code transmitter 24 is first of all operated, as a result of which the latter transmits the locking signal and the identification signal. Using the identification signal, the vehicle checks whether the portable code transmitter 24 is authorized to lock the car in the first place. Following a successful check on the identification signal, the car 10 is locked. Alternatively, however, it is likewise possible for the car 10 to be locked in another way, for example by automatic locking of the car 10 when a particular speed is exceeded during vehicle operation, by operation of a central locking switch in the interior of the car 10 or the like. In any case, the locking of the car 10 is detected by the starting system.

In S2, the monitoring device 18 is used to check whether the portable code transmitter 24 is inside the monitoring region of the monitoring device 18. In the present case, the monitoring region is substantially the passenger interior of the car 10. The monitoring device 18 performs said monitoring by virtue of the monitoring device 18 transmitting a request signal, the portable code transmitter 24 receiving the request signal if said portable code transmitter is inside the monitoring region, that is to say inside the car 10, and for its part transmitting a response signal that the monitoring device 18 receives, as a result of which the latter detects that the portable code transmitter 24 is inside the monitoring region.

In S3, the control device 16 deactivates the starting device 20 if the portable code transmitter 24 is not inside the monitoring region, that is to say not inside the car 10. On account of the deactivation of the starting device 20, it is now no longer possible to start the engine 14 by operating the starting device 20 of the car 10. If the portable code transmitter 24 is inside the monitoring region, that is to say inside the car 10, the starting device 20 is not deactivated, this being characterized by S3'. By way of example, this is intended to avoid cases in which a driver is still sitting in the car 10 and locking has taken place. In such cases, it is meant to be possible, as previously, for operation of the starting device 20 to allow the engine 14 of the car to be started again.

In S4, the operator control element 28 of the portable code transmitter 24 is then operated, as a result of which firstly an unlocking signal is transmitted wirelessly and secondly an identity signal comprising identity data is transmitted, likewise wirelessly, by the portable code transmitter 24. During the wireless transmission of the unlocking signal by the portable code transmitter 24, an identification signal is additionally transmitted wirelessly, said identification signal being used to perform a check on authorization of the portable code transmitter 24 to unlock the car 10. Only if the portable code transmitter 24 has been authorized by checking the identification signal is the car 10 unlocked again. Furthermore, the starting system 12 on the car receives the unlocking signal and also the identity signal.

In subsequent S5, the control device 16 is used to check whether the identity data received with the identity signal match identity data stored in the starting system. For this, appropriate identity data may be stored in a memory—not shown—of the control device 16, for example. Furthermore, although not shown here—it is additionally possible for a user himself to make an alteration to the identity data stored in the starting system and then for the portable code transmitter 24 and/or further portable code transmitters to be provided with the new identity data.

In subsequent S6, the starting device 20 is activated by the control device 16 if the identity data received with the identity signal match the identity data stored in the starting system. After the starting device 20 has been activated, it is now again possible, in principle, to start the engine 14 of the car 10 by operating the starting device 20.

If the identity data received with the identity signal do not match the identity data stored in the starting system or if at least one of the doors of the car 10 has been unlocked by the portable code transmitter 24 without the operation of the operator control element of the portable code transmitter 24, the portable code transmitter 24 is positioned inside a prescribed effective region of the authentication device 22 in an S5'. By way of example, the authentication device 22 may be a transponder coil that is arranged in the interior of the car 10.

In an S5", the authentication device 22 checks whether authorization is available for the starting device 20 to be activated by the code transmitter 26. By way of example, the authentication device 22 repeatedly transmits a request signal that has just one range inside the effective region of the authentication device 22. This is only a few centimeters. As soon as the request signal has been transmitted, the authentication device 22 changes to a reception mode for a predetermined period. If the portable code transmitter 24 is positioned inside the effective region, it receives the request signal and for its part in turn transmits a response signal that the authentication device 22 receives. If this is a correct response signal, appropriate authorization of the portable code transmitter 24 is established. In this case, S6 is subsequently performed, in which the control device 16 activates the starting device 20 again. If no authorization for the portable code transmitter 24 is established by the authentication device 22, S6' takes place, in which the starting device 20 remains deactivated.

If at least one of the doors of the car 10 has been unlocked without the portable code transmitter 24, and the portable code transmitter 24 is also not inside the monitoring region, that is to say inside the car 10, the starting device 20 is likewise not activated. By way of example, this may be the case when someone opens the car 10 by force in order to steal it. In this case, although there may be access to the interior of the car 10, the still deactivated starting device 20 of the car 10 means that it is not possible to start the engine 14.

In S7, the activated starting device 20 is then operated, for example by virtue of a user operating the start/stop button, not shown here. In S8, the monitoring device 18 immediately checks whether the portable code transmitter 24 is positioned inside the monitoring region, that is to say inside the car 10. Following a successful check, a starting procedure for the engine 14 of the car 10 is initiated in S9. However, if the monitoring device 18 is used to establish that the portable code transmitter 24 is not inside the monitoring region, that is to say inside the car 10, S9' follows, in which the engine is not started.

In subsequent S10, when the engine 14 is running, a door that closes the passenger compartment is opened. In S11, the monitoring device 18 checks whether the portable code transmitter 24 continues to be inside the monitoring region, that is to say inside the car 10. If it is established that the portable code transmitter is no longer inside the monitoring region, a warning signal is output in S12. By way of example, it is conceivable for a front-seat passenger to keep the portable code transmitter 24 in a pocket, for the car 10 to be stopped while the engine 14 is running, and for the front-seat passenger together with the portable code transmitter 24 to get out of the car 10. In this case, although the engine 14 would continue to run, the driver of the car 10 would immediately be made aware by the output warning signal that the portable code transmitter 24 is no longer inside the car 10. If, however, in S11 the monitoring device 18 is used to establish that the portable code transmitter 24 continues to be inside the monitoring region, S12' takes place, in which no warning signal is output.

In this case, monitoring of the portable code transmitter 24 by the monitoring device 18 in S11 is likewise effected if a window of the car 10 is opened or a sliding roof apparatus of the car 10 is opened, for example. This ensures that the driver of the car 10 is at least made aware if the portable code transmitter 24 should no longer be inside the car 10. A situation in which the engine 14 is switched off and cannot be started again because the portable code transmitter 24 is no longer in the region of intervention of the driver can be effectively prevented thereby.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A method for operating a starting system for a car, the method comprising:
   detecting, by the starting system, locking of a door of the car;
   when the locking of the door of the car is detected, checking, using a monitoring device in the starting system, whether a portable code transmitter for the starting system is inside a monitoring region of the monitoring device;
   deactivating a starting device of the starting system using a control device of the starting system if the portable code transmitter is not inside the monitoring region;
   operating an operator control element of the portable code transmitter and wirelessly transmitting, by the portable code transmitter, an unlocking signal that initiates an unlocking of the door of the car and an identity signal that comprises identity data;
   receiving, by the starting system, the unlocking signal and the identity signal;
   checking, using the control device, whether the received identity data matches identity data stored in the starting system; and
   activating the starting device using the control device if the received identity data matches the stored identity data.

2. The method as claimed in claim 1, wherein if the door is locked, the starting device is deactivated only if the portable code transmitter is not inside the monitoring region.

3. The method as claimed in claim 1, wherein
   the starting device is a keyless starting device for allowing an engine to be started, without a key being inserted into an ignition lock, and
   when the starting device is activated, a starting procedure for the engine is initiated using a start/stop button.

4. A method as claimed in claim 1, wherein
   the operator control element of the portable code transmitter is a manually operated unlock device on the portable code transmitter, and
   after the starting device has been deactivated, the starting device is reactivated only if the operator control element of the portable code transmitter has been manually operated or if the portable code transmitter is placed in close proximity to an ignition switch.

5. The method as claimed in claim 1, further comprising:
   checking, using the monitoring device, whether the portable code transmitter is inside the monitoring region, which comprises a passenger compartment of the car, by transmitting a request signal; and
   if the portable code transmitter is inside the monitoring region:
      receiving, by the portable code transmitter, the request signal;
      transmitting, using the portable code transmitter, a response signal; and
      receiving, by the monitoring device the response signal.

6. The method as claimed in claim 1, wherein the monitoring device checks whether the portable code transmitter of the starting system is inside the monitoring region exclusively when the starting device is activated.

7. The method as claimed in claim 1, wherein
   the unlocking signal is transmitted with a first identity signal,
   if the identity data of the first identity signal matches the stored identity data, the starting device is activated, and
   after the starting device is activated, the monitoring devices uses a second identity signal to check whether the portable code transmitter of the starting system is inside the monitoring region.

8. The method as claimed in claim 1, wherein if the received identity data does not match the stored identity data:
   checking for authorization to activate the starting device when the portable code transmitter is positioned inside a prescribed effective region of an authentication device of the starting system; and
   if the authorization is available, activating, using the control device, the starting device.

9. The method as claimed in claim 8, wherein the prescribed effective region is a region proximate to a transponder coil which checks for authorization of the portable code transmitter without requiring the portable code transmitter to have a battery charge.

10. The method as claimed in claim 1, wherein if the door of the car is unlocked using the portable code transmitter without operation of the operator control element of the portable code transmitter:
   checking for authorization to activate the starting device when the portable code transmitter is positioned inside a prescribed effective region of an authentication device of the starting system; and
   if the authorization is available, activating, using the control device, the starting device.

11. The method as claimed in claim 1, wherein if the door of the car is unlocked without the portable code transmitter and the portable code transmitter is not inside the monitoring region, the starting device is not activated.

12. The method as claimed in claim 1, wherein after the starting device is activated and a start/stop button has been operated, determining whether the portable code transmitter is inside the monitoring region, and if the portable code transmitter is determined to be inside the monitoring region, initiating a starting procedure for an engine of the car using the starting device.

13. The method as claimed in claim 12, wherein
the unlocking signal is transmitted with a first identity signal,
if the identity data of the first identity signal matches the stored identity data, the starting device is activated, and
a second identity signal is used to determine whether the portable code transmitter is inside the monitoring region, the second identity signal being different from the first identity signal.

14. The method as claimed in claim 12, wherein after the starting device has been activated and after the start/stop button has been operated, a different identity signal is used to determine whether the portable code transmitter is inside the monitoring region.

15. The method as claimed in claim 1, further comprising determining, using the monitoring device, whether the portable code transmitter is inside the monitoring region when an engine of the car is running and the door, a sliding roof apparatus, and/or a window that closes the passenger compartment is open, and outputting a warning signal if the portable code transmitter is determined not to be inside the monitoring region.

16. The method as claimed in claim 1, further comprising unlocking the door of the car based on the identity signal and the unlocking signal.

17. The method as claimed in claim 16, wherein
the unlocking signal is transmitted together with the identity signal and a door lock identification,
the identity signal is used to activate the starting device, and
the door lock identification signal is used to check whether unlocking of the door is authorized.

18. The method as claimed in claim 1, further comprising:
changing the identity data stored in the starting system to new identity data;
storing the new identity data on a user-defined basis, in the starting system; and
storing the new identity data in the portable code transmitter and/or an additional portable code transmitter.

19. A starting system for a car, the starting system comprising:
a starting device;
a portable code transmitter comprising an operator control element to initiate wireless transmission of an unlocking signal to unlock a door of the car and an identity signal comprising identity data;
a monitoring device to determine whether the portable code transmitter is inside a monitoring region;
and
a control device to detect locking and the unlocking of the door of the car, wherein
if the door is detected to be locked and the portable code transmitter is determined not to be inside the monitoring region, the control device deactivates the starting device, and
if the unlocking signal and the identity signal are received by the starting system, the control device:
checks whether the identity data received with the identity signal match identity data stored in the starting system; and
activates the starting device if the identity data received with the identity signal match the identity data stored in the starting system.

20. A car comprising a starting system, the starting system comprising:
a starting device;
a portable code transmitter comprising an operator control element to initiate wireless transmission of an unlocking signal to unlock a door of the car and an identity signal comprising identity data;
a monitoring device to determine whether the portable code transmitter is inside a monitoring region;
and
a control device to detect locking and the unlocking of the door of the car, wherein
if the door is detected to be locked and the portable code transmitter is determined not to be inside the monitoring region, the control device deactivates the starting device, and
if the unlocking signal and the identity signal are received by the starting system, the control device:
checks whether the identity data received with the identity signal match identity data stored in the starting system; and
activates the starting device if the identity data received with the identity signal match the identity data stored in the starting system.

* * * * *